(12) United States Patent
Zhang et al.

(10) Patent No.: US 7,827,184 B2
(45) Date of Patent: Nov. 2, 2010

(54) SYSTEM AND METHOD FOR MODELING USER SELECTION FEEDBACK IN A SEARCH RESULT PAGE

(75) Inventors: Ruofei Zhang, San Jose, CA (US); Ramesh R. Sarukkai, Union City, CA (US)

(73) Assignee: Yahoo! Inc., Sunnyvale, CA (US)

( * ) Notice: Subject to any disclaimer, the term of this patent is extended or adjusted under 35 U.S.C. 154(b) by 360 days.

(21) Appl. No.: 11/733,585

(22) Filed: Apr. 10, 2007

(65) Prior Publication Data

US 2008/0256050 A1     Oct. 16, 2008

(51) Int. Cl.
  *G06F 17/30* (2006.01)
(52) U.S. Cl. ........................... 707/748; 707/750
(58) Field of Classification Search ........................ None
  See application file for complete search history.

(56) References Cited

U.S. PATENT DOCUMENTS

2009/0030876 A1 *   1/2009   Hamilton ........................ 707/3

* cited by examiner

*Primary Examiner*—Baoquoc N To
(74) *Attorney, Agent, or Firm*—Seth H. Ostrow; Ostrow Kaufman LLP

(57) ABSTRACT

The present invention provides for improving the search relevance of a search results page by including a perceived relevance factor. The system, device and method monitors user selection of elements in the search results page, where these selections indicate relevance of the element compared with the original search request. A perceived relevance factor for the element is then determined based on probabilistic-based computations accounting for the element, which may include a description, a thumbnail and/or meta data, and the position of the element on the search results page. Thereby, for future searches and search results page generation, relevance factors may be calculated based on various factors, including the element attribute based relevant scores and the perceived relevance factor.

24 Claims, 4 Drawing Sheets

SYSTEM AND METHOD FOR MODELING USER SELECTION FEEDBACK IN A SEARCH RESULT PAGE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention relates generally to Internet search enhancements and more specifically to the monitoring of user activity in the selection of search term results and enhancing the presentation of search term results based on relevance calculations.

BACKGROUND OF THE INVENTION

Basic web-based content searching techniques are well known. Common examples are readily visible in publicly available Internet searching portals. With the organic growth of content on the Internet, searching techniques are only as good as ability to prioritize or sort content references (e.g. description data and the hyperlink). Additionally, the vast number of searchable content is searched by a limited number of search terms, typically relatively basic terms, thus compounding the relevance concerns when returning search results.

Existing search result generation techniques recognize and incorporate relevance aspects when sorting and prioritizing search results. The sorting and prioritizing is typically a precursor operation to the generation of a search results page, which can be the hypertext markup language (HTML) page with hyperlinks and other content sent to the requesting user. For example, a first search results page may be the first twenty-five links as sorted and prioritized by the search engine. Various engines may use different techniques for sorting and prioritizing the content. The search results page may be one of any number of pages, either limited by the number of search results or system-limited to show only a set number of results, for example the first 500 results.

In existing techniques, the relevance score of a document is calculated solely based on attributes of the document and the query, such as term statistics, site authority, document-query similarities, etc. The term documents, as used herein, refers generally to any suitable type of content that is accessible and viewable through the Internet, including HTML-encoded documents, proprietary-encoded document (e.g. PDFs), audio and/or video files, images, etc.

Existing systems discard any information associated with a user selection of, e.g. clicking, a particular link. Rather, these systems merely accept the user selection as a retrieval or a redirection command and do not utilize this information for additional calculations. User selection is in-effect an indication of the users' implicit relevance of the document because if the user selects the document, it can be inferred as having a greater degree of relevance to the original query. This user selection is a direct feedback mechanism ignored by existing searching systems. The implicit relevance of a user selection is especially true for image and video searches because the users are presented with thumbnails and descriptions of the image and/or videos within the search results page. If users click a video item frequently for a query, this video has a very high probability to be relevant to the query.

Therefore, there exists a need for an improved search result generation technique that models and incorporates the user selection activity in improving relevance calculations, as well as using the model learned to derive an improved relevance calculations for generating improved search result pages.

SUMMARY OF THE INVENTION

Generally, the present invention provides for improving the search relevance of a search results page by including a perceived relevance factor. Systems, devices and methods in accordance with embodiments of the present invention monitor user selection of elements in the search results page, where these selections indicate relevance of the element compared with the original search request. A perceived relevance factor for the element is then determined based on probabilistic-based computations accounting for the element, which may include a description, a thumbnail and/or meta data, and the position of the element on the search results page. Thereby, for future searches and search result page generation, relevance factors may be calculated based on various factors, including the element attribute based relevant scores and the perceived relevance factor.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

In the following description of the embodiments of the invention, reference is made to the accompanying drawings that form a part hereof, and in which is shown by way of illustration exemplary embodiments in which the invention may be practiced. It is to be understood that other embodiments may be utilized and structural changes may be made without departing from the scope of the present invention.

Figure 1:
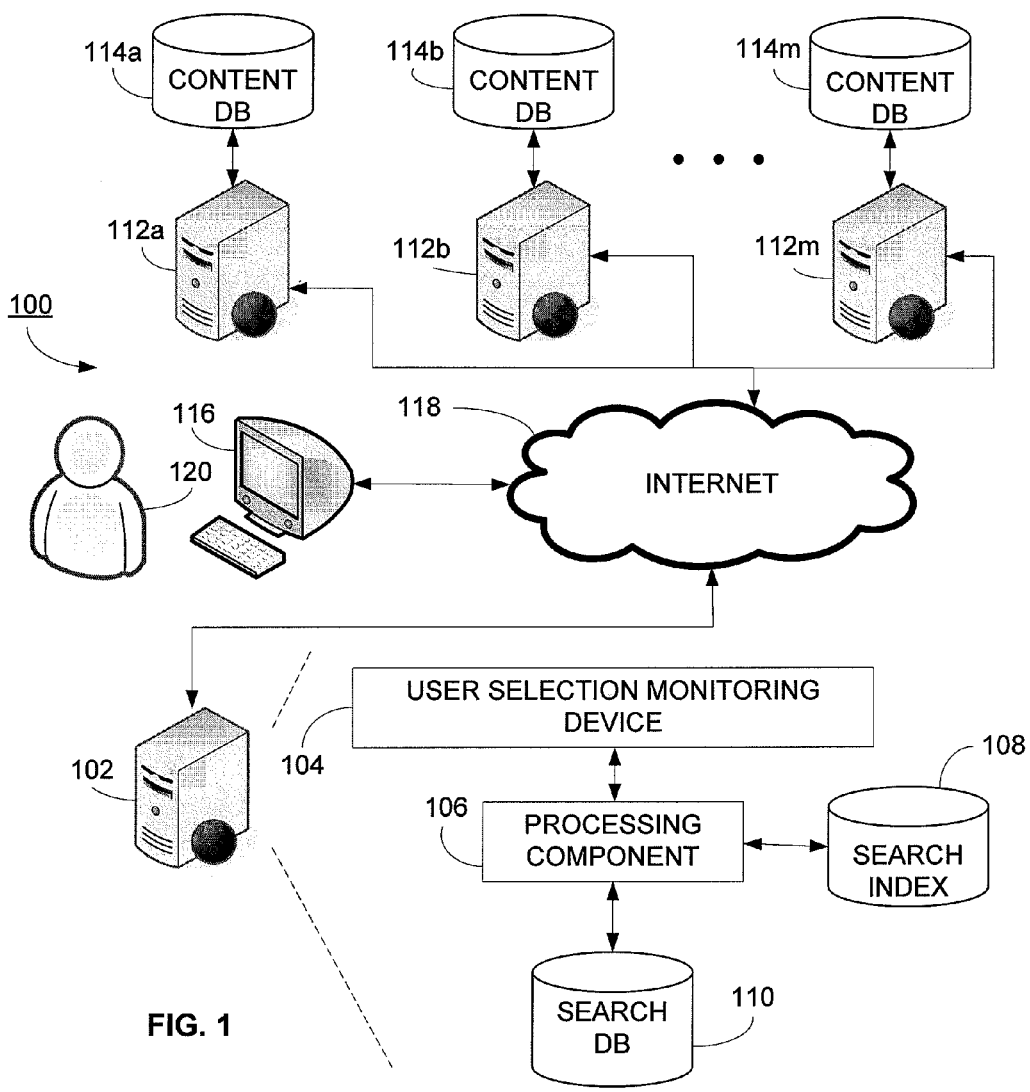
FIG. 1 illustrates one embodiment of a system providing for improved search relevance for a user search.

FIG. 1 illustrates a system 100 that includes a network server 102 including a user selection monitoring device 104, a processing component 106, search index 108 and a search database 110. The system 100 also includes a plurality of content-based network servers 112a, 112b, 112m and content databases 114a, 114b, 114m, where m is any suitable integer value. Additionally, the system 100 includes a user computer 116 and communication across the Internet 118.

The network servers 102 and 112 may be any suitable type of computing server operative to communicate via the Internet 118, e.g., receiving and transmitting information across the network 118. The network server 102 further includes functionality as described herein including the user selection monitoring device 104, the processing component 106 and the memory components of the search database 110 and the search index 108. The device 104 and the component 106 may be one or more processing devices operative to perform various operations in response to executable instructions.

Figure 2:
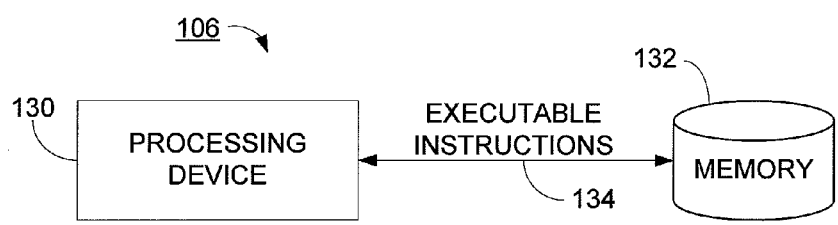
FIG. 2 illustrates one embodiment of a processing device providing for improved search relevance for a user search.

For example, FIG. 2 illustrates one embodiment of the processing component 106 including the processing device 130, memory device 132 and executable instructions 134 stored in the memory device 132, usable by the processing device 130 for performing processing operations as described herein. It is recognized by one skilled in the art that many additional components and processing elements in the network server 102 have been omitted for clarity purposes only.

Additionally, the search database 110 and the search index 108 may be one or more storage devices having associated data stored therein. For example, the search database may include usable information to facilitate an Internet search, such as information on the various content available via the Internet, which may include hyperlinks to the content itself, meta data as well as descriptive data provided to a user when presented with search results, e.g. a short description of the document, as well as a thumbnail or other type of visual component.

The networks servers 112 provide the functionality for facilitating data retrieval operations relative to the content databases 114. For example, if a user requests a document and this document is stored in the content database 114, the network server routes the data request, retrieves the document and transmits to the user computer 116 in accordance with known techniques.

In the operation of the system 100, a user 120 utilizes the computing device 116 to access the network server 102. The computing device 116 is illustrated as a persona computer, but it is recognized that generally speaking, the computing device 116 may be any device having Internet accessibility and the network server 102 is not limited to interacting solely with the personal computer 116. The network server 102 operates an Internet-based search engine whereby the user 120 enters one or more search terms and the network server performs a content search 102. The searching may be done using internally cached documents and/or indexes of web-based documents.

The operations of conducting the search and post-searching activities are discussed in further detail below with regard to the flowchart of FIG. 3. Although, for completeness as to FIG. 1, when a user is presented with a search results page and selects, e.g. clicks, on a hyperlink, standard routing techniques may be used to access documents via the content database 114 through the web server 112.

Figure 3:
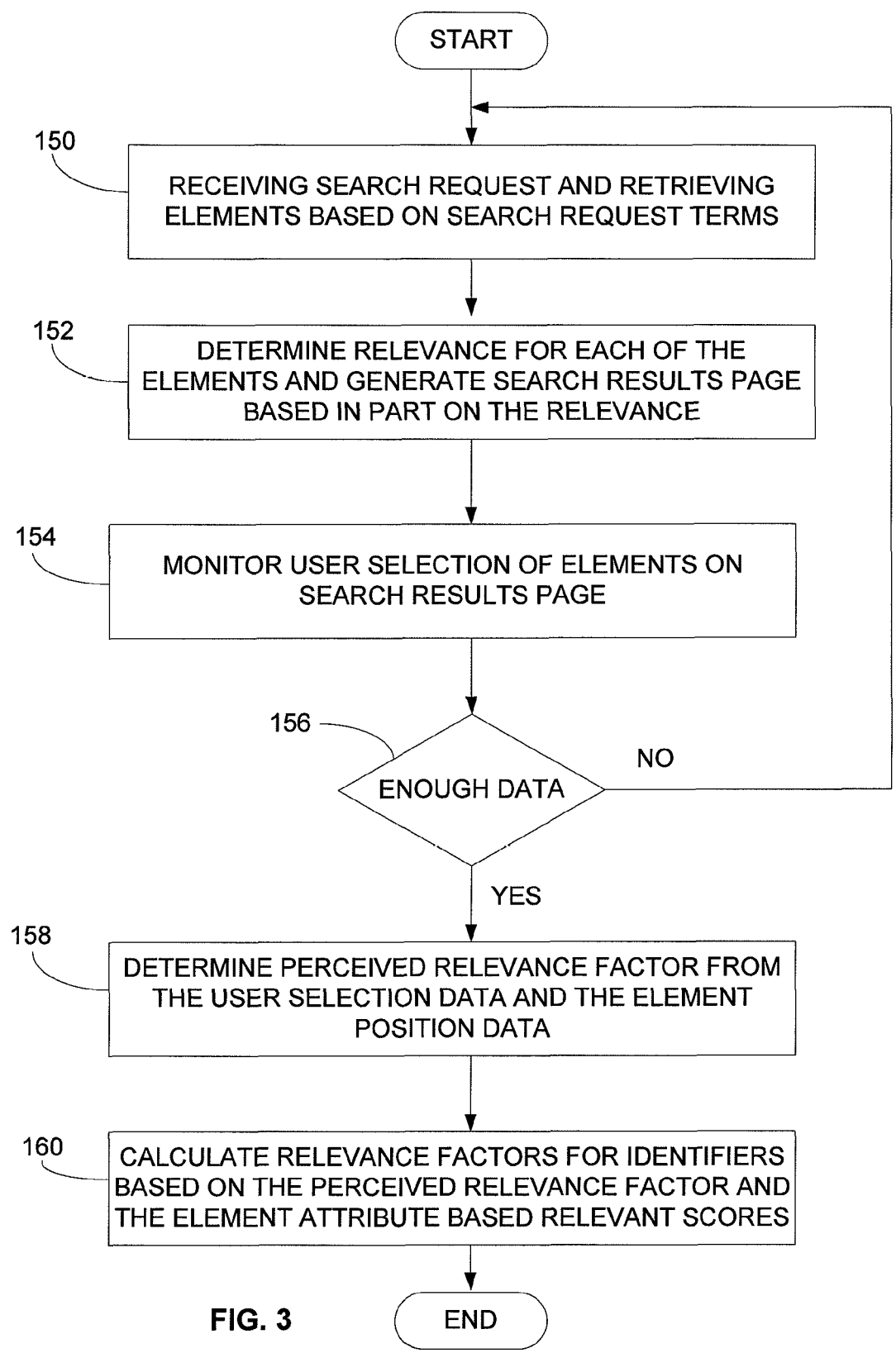
FIG. 3 illustrates a flow chart of the steps of one embodiment of a method for improved search relevance for a user search.

With respect to FIG. 3, the steps may be performed by elements within the network server 102 including the user selection monitoring device 104 and the processing component 106 and more specifically the processing device 130 in response to the executable instructions 134 of FIG. 2.

In the method of improving search relevance for a user search, a first step, step 150, is to receive the search request and retrieve document identifiers based on the search request terms. In the system 100 of FIG. 1, the processing device 130 in the processing component 106 may access the search database 110. The next step, step 152, is to determine relevance for each of the documents identified by the document identifiers and generate a search results page based in part on this relevance. The network server 102 may then transmits the search results page to the computing device 116 through the Internet 118.

The user 120 reviews the search result page and may thereupon select one of the identifiers. In typical operations, the selection directs the browser to retrieve, through standard Internet protocols, content at predetermined storage locations, as defined by the corresponding universal resource locator and underlying DNS identifiers.

Although, the system and method for improving search relevance includes the user selection monitoring device 104 that monitors which document identifier the user selects. This monitoring device 104 may actively monitor user activity through a remotely disposed (e.g. on the computer 116) application or may include a local application that receives feedback information on the user selection. For example, the browser may simultaneously send a document retrieval request to one of the network servers 112 and send a selection command to the search engine server 102. In another embodiment, the document retrieval and/or redirection may be processed through the search engine server 102 so that the user selection is readily determined from this retrieval or redirection command.

In one embodiment, a decision step 156 determines if enough data has been collected. This step 156 may be based on predetermined guidelines, such as the number of search queries and user selections, time intervals or any other suitable type of guideline.

In the answer to the inquiry in step 156 is in the negative, the method repeats back to step 150 for repeating steps 150, 152 and 154, conducting additional user searches, generating additional search result pages and monitoring additional user selections. As described in further detail below, generation of additional search result pages for the same query may be done with placing the document identifiers at different locations to obtain additional information when determining perceived relevance. When enough data has been collected, the method proceeds to step 158 which includes determining a perceived relevance factor from the user's selection and the element position data.

The determination of the perceived relevance can be determined based on a statistical model to model user clicking activities on one of the document identifiers at different locations on the search results page. As the search index 108 is dynamic and updated frequently, the position of a search result document identifier changes dynamically.

Through the processing of an algorithm by the processing component 106, the processing device 130 calculates a perceived relevance score of the search results based on logging the user selection. The algorithm can calculate the effect of a thumbnail of an image or video to users' selection for a query. The algorithm can also measure an expected probability for a particular document identifier to be selected by a user in response to a particular query in the event the thumbnail is not visible, thus determining relevance based primarily on position of the document in the search results page.

Upon computing the probability for each pair element, i.e. the query itself and the selected document identifier, the algorithm can thereby calculate the relevance score of the document identifier based on the users' perceiveness by inversing the probability as this value reflects the effects of the thumbnail and the metadata to the user for selecting the video/image. The algorithm estimates probability by modeling user clicks on the search result page positions as a multinomial distribution, where the multinomial distribution is a generalization of the binomial distribution. The binomial distribution is the discrete probability distribution of the number of successes in n independent Bernoulli trials with same probability p of success on each trial.

Instead of the user selection trials, i.e. placement of a document identifier on a search results page, the algorithm determines that each user click trial results in one of some fixed finite number k of possible outcomes, with probability $P_1, P_2, \ldots P_K$, and there are n independent trials. A random variable Xi indicates the number of times outcome number i is observed over n trials. Thus, the distribution vector $(X_1 \ldots X_K)$ defines the multinomial distribution. The joint probabilities of $(X_1 \ldots X_K)$ are given by Equation 1.

$$P(X_1 = x_1, \ldots, X_k = x_k) = \begin{cases} \dfrac{n!}{x_1! \ldots x_k!} p_1^{x_1} \ldots p_k^{x_k} & \text{when } \sum_{i=1}^{k} x_i = n \\ 0 & \text{otherwise} \end{cases} \quad \text{EQUATION 1}$$

Each user selection can be placed on any position up to position K on the search results page. Each position has a prior probability of being clicked by a user, ignoring the effect of the search terms, the thumbnail image, and the metadata and focusing only on position information. The prior probabilities are $P_1, P_2, \ldots P_K$, where K is the number of possible positions on the search results page, including across multiple search result pages. The prior probabilities can be determined by processing the user selection logs over a defined period of time, i.e. the probability of a document identifier being selected in the first position, selected in the second positions, selected in the third position, etc.) Stated another way, a user selection has $P_1$ probability on the first position, $P_2$ probability on the second position and so forth including position K.

A relevance score may then be determined based on the following statistical model. Assume that a search item object identifier (OID), which is the same as the document identifier described above, for a query Q is clicked $\{X_1, X_2, \ldots X_K\}$ times on the positions $1, 2, \ldots, K$, then the probability of this user selection event sequence can be calculated by applying the multinomial distribution of Equation 2.

$$P(OID) = P(X_1 = x_1, X_2 = x_2, \ldots, X_k = x_k) = \quad \text{EQUATION 2}$$
$$n!/(x_1!x_2!,\ldots xk!) * P_1^{x_1} * P_2^{x_2} * \ldots P_k^{x_k}$$

Where $\sum_{i=1}^{k} x_i = n$ from 1 to K

The value P(OID) indicates the probability that result item OID is selected as shown in the user selection instance $\{X_1, X_2, \ldots X_K\}$ for query Q if the user does not look at the thumbnail and the meta data of the result item, but only makes a selection based on the position of the document identifier, also referred to as the object identifier. Thereby, the inverse of the probability measures the effect of the thumbnail and metadata of the document identifier for the user's selection based on the query Q. A perceived relevance score can be determined based on Equation 3:

Relevance Score $RS=1/P(OID)$      Equation 3

Referring back to FIG. 3, in the method a next step, step 160, may be calculating the relevance factors for identifiers based on the perceived relevance factor and the document attribute based relevant scores. The perceived relevant score may be intermittently stored in the search index 108. Additionally, the step of determining the perceived relevance factor may be performed offline, thereby not reducing system resources focused on the searching, prioritizing and search result page generation activities described above. Based on the computation of the n-tuples for the query, result item and relevance score RS, the n-tuples may be used in conjunction with existing relevance factors for prioritizing search results. As described above, existing document attribute based relevant scores can be determined on a wide variety of existing criterion as is known in the art. The inclusion of the perceived relevance score thereby adds an additional factor when generating a search results page. Thereby, in one embodiment, the method of FIG. 3 is complete.

Figure 4A:
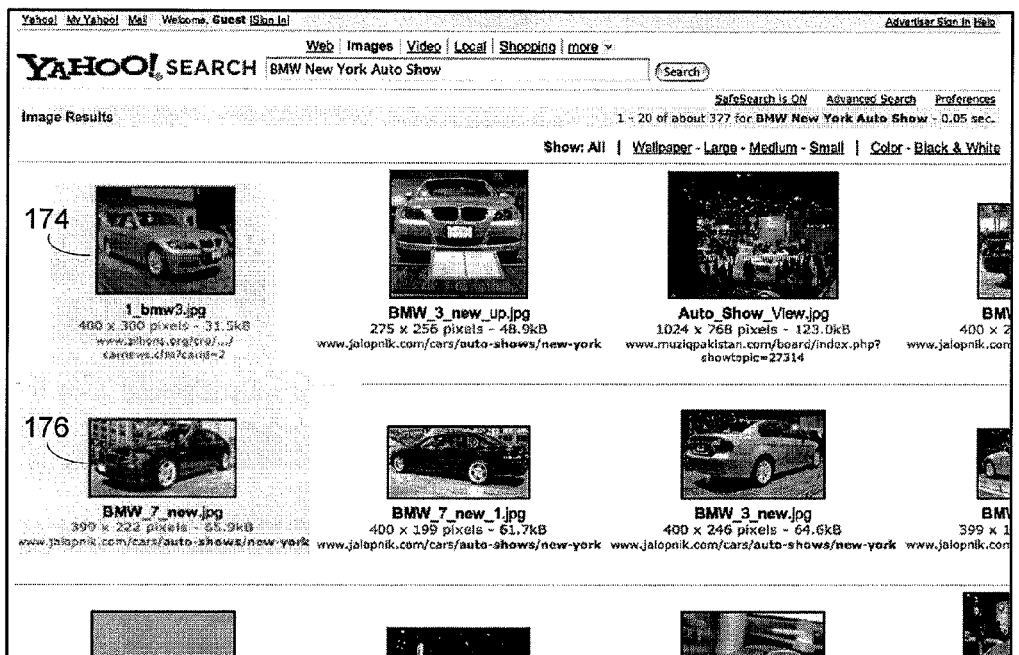
FIGS. 4a and 4b illustrate sample screen shots of a search result page generated by improved search relevance for a picture search.
Figure 4B:
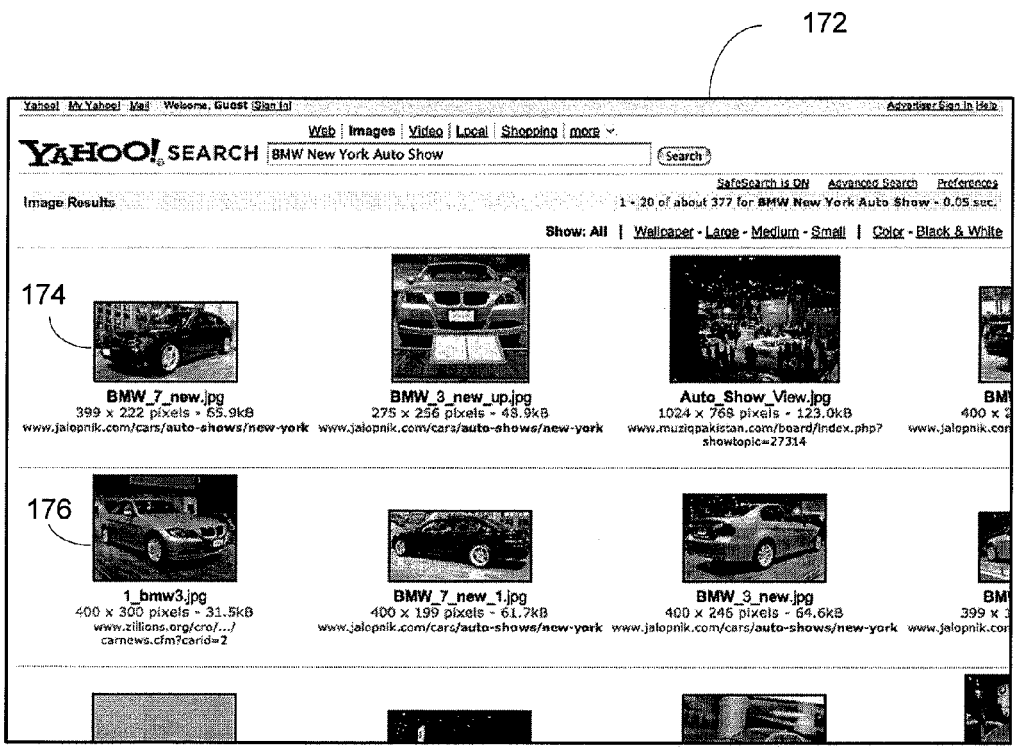

For further illustration, FIGS. 4a and 4b are sample screen shots 170 and 172 respectively. These sample screen shots illustrate search result pages for a sample image search using the query terms "BMW New York Auto Show." The screen shots 170 and 172 show various document identifiers, here including thumbnails and the text of the location hosting the image. Between screen shots 170 and 172, document identifiers are at different locations. Images 174 and 176 are reversed where a perceived relevance may account for moving image 176 to the first position in the first row instead of the first position on the second row. FIGS. 4a and 4b may represent different search result pages generated during the user selection retrieval period, for example changing the location of a particular image for the same query Q.

Also, FIGS. 4a and 4b may represent different search result pages generated based on the inclusion of the perceived relevance with the existing relevance factors. In the screen shot 170, image 174 may have a higher degree of relevancy at the time and at a later point in time, image 176 may be determined to have a greater degree of relevancy by incorporating the perceived relevance score RS and hence changing its position.

Figure 5A:
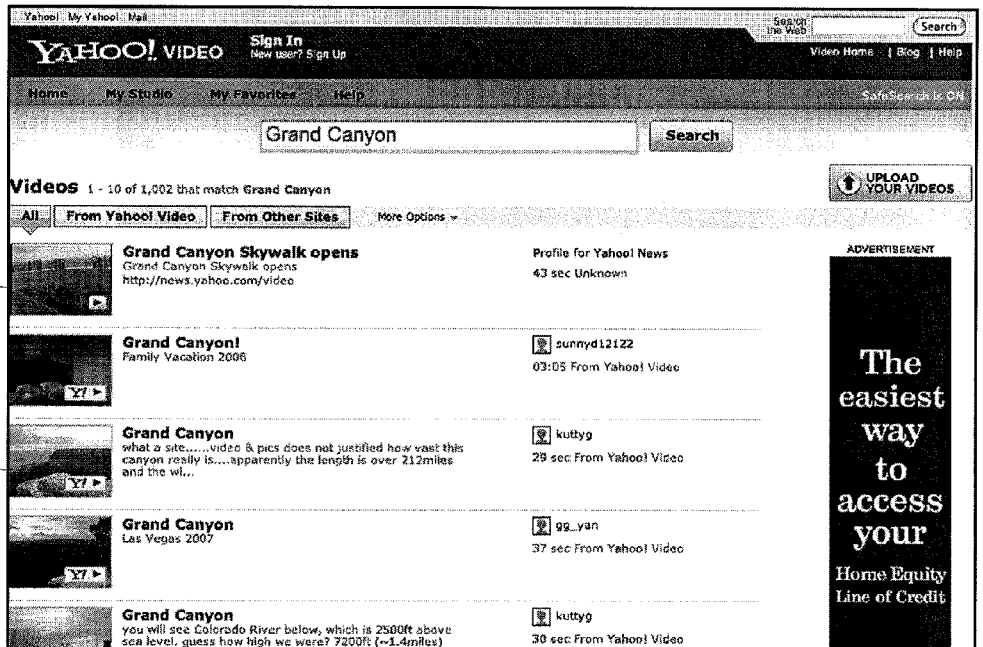
FIGS. 5a and 5b illustrate sample screen shots of a search result page generated by improved search relevance for a video search
Figure 5B:
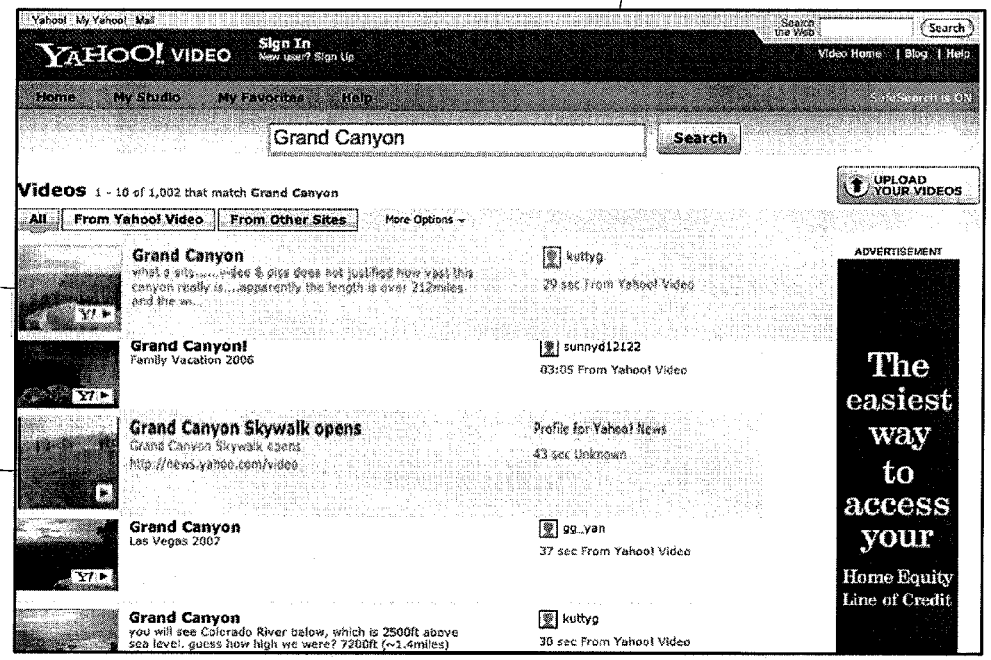

Similarly, FIGS. 5a and 5b illustrate sample screen shots of different search result pages 180 and 182 for a video search using the search query "Grand Canyon." The search result pages 180 and 182 include document identifiers, as well as text. The ordering of the document identifiers is adjusted between the screen shots with the identifier 184 and 186 being swapped in position. Similar to FIGS. 4a and 4b, these screenshots may represent different positioning of document identifiers for user selection data acquisition. Also, FIGS. 5a and 5b may illustrate the adjustment of the relevance of the document identifiers in response to the user query based on computations including the perceived relevance as described above.

As such, the system, method and device improves search results by including perceived relevancy. By monitoring and using user selection information, the accuracy of search result pages can be improved through improving the relevancy and thereby the subsequent ordering of search result items for particular user queries.

FIGS. 1-5 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A method for improving search relevance for a user search, the method comprising:
    generating a search results page in response to a search request, the search result page including document identifiers for each of a plurality of referenced documents retrieved in response to the search request;
    monitoring user selection of one of the document identifiers, including monitoring a page position of the user selected document identifier;
    determining a perceived relevance factor for the selected document identifier including prior probability calculations based on the page position of the user selected document identifier to determine relevance based on a position of the document identifier on the search results page and an inverse of the probability calculations to determine relevance of the identifier and identifier meta data; and
    calculating a relevance factor for the selected document identifier based on the perceived relevance factor and a plurality of document attribute based relevant scores.

2. The method of claim 1 further comprising:
    storing the relevance factor to a search index.

3. The method of claim 2 further comprising:
    upon receipt of a new search request, accessing the search index to determine the relevance factor for the selected identifier; and
    placing the selected identifier at a specific position in a new search results page based on the relevance factor.

4. The method of claim 1 wherein the user search relates to at least one of: a video search and an image search.

5. The method of claim 1 wherein each identifier includes a thumbnail.

6. The method of claim 1 wherein the perceived relevance factor may be computed in an offline computation.

7. The method of claim 1 wherein the step of determining the perceived relevance factor based on the user selection includes modeling user selection activities with a statistical model.

8. The method of claim 7 wherein the statistical model is based on the probability calculations.

9. A system for improving search relevance for a user search, the system comprising:
    a search database having a plurality of document identifiers for each of a plurality of referenced documents;
    a processing device operative to, based on executable instructions, generate a search results page in response to a search request, the search results page including the plurality of document identifiers such that the search results page is presented to a user;
    a user selection monitoring device operative to determine user selection of one of the document identifiers, including monitoring a page position of the user selected document identifier, and
    the processing device further operative to, based on the executable instructions:
    determine a perceived relevance factor for the selected document identifier including prior probability calculations based on the page position of the user selected document identifier to determine relevance based on a position of the document identifier on the search results page and an inverse of the probability calculations to determine relevance of the identifier and identifier meta data; and
    calculate a relevance factor for the selected document identifier based on the perceived relevance factor and a plurality of document attribute based relevant scores.

10. The system of claim 9 further comprising:
    a search index operatively coupled to the processing device, the search index having the relevance factor stored therein.

11. The system of claim 10 wherein the processing device, in response to the executable instruction, is further operative to:

upon receipt of a new search request, access the search index to determine the relevance factor to the selected identifier; and place the selected identifier at a specific position in a new search results page based on the relevance factor.

12. The system of claim 9 wherein the user search relates to at least one of: a video search and an image search.

13. The system of claim 9 wherein each identifier includes a thumbnail.

14. The system of claim 9 wherein the perceived relevance factor, as computed by the processing device in response to the executable instructions, may be computed in an offline computation.

15. The system of claim 9 wherein the executable operation of determining the perceived relevance factor based on the user selection as performed by the processing device includes modeling user selection activities with a statistical model.

16. The system of claim 15 wherein the statistical model is based on the probability calculations.

17. A computer readable medium having executable instructions stored thereon such that upon execution of the instructions, a processing device is operative to:

generate a search results page in response to a search request, the search result page including document identifiers for each of a plurality of referenced documents retrieved in response to the search request;

monitor user selection of one of the document identifiers, and monitor a page position of the user selected document identifier;

determine a perceived relevance factor for the selected document identifier including prior probability calculations based on the page position of the user selected document identifier to determine relevance based on a position of the document identifier on the search results page and an inverse of the probability calculations to determine relevance of the identifier and identifier meta data; and calculate a relevance factor for the selected document identifier based on the perceived relevance factor and a plurality of document attribute based relevant scores.

18. The computer readable medium of claim 17 having executable instructions stored thereon such that upon execution the processing device is further operative to:

store the relevance factor to a search index.

19. The computer readable medium of claim 18 having executable instructions stored thereon such that upon execution the processing device is further operative to:

upon receipt of a new search request, access the search index to determine the relevance factor for the selected identifier; and place the selected identifier at a specific position in a new search results page based on the relevance factor.

20. The computer readable medium of claim 17 wherein the user search relates to at least one of: a video search and an image search.

21. The computer readable medium of claim 17 wherein each identifier includes a thumbnail.

22. The computer readable medium of claim 17 wherein the perceived relevance factor may be computed in an offline computation.

23. The computer readable medium of claim 17 wherein the executable instruction of, as performed by the processing device, determining the perceived relevance factor based on the user selection includes modeling user selection activities with a statistical model.

24. The computer readable medium of claim 23 wherein the statistical model is based on the probability calculations.

* * * * *